Sept. 8, 1959     T. F. SARAH     2,903,202
CLOSED FACE SPINNING REEL

Filed March 28, 1957     3 Sheets-Sheet 1

INVENTOR.
THOMAS F. SARAH
BY *Ely Frye*
*Hamilton*
ATTORNEYS

Sept. 8, 1959  T. F. SARAH  2,903,202
CLOSED FACE SPINNING REEL
Filed March 28, 1957  3 Sheets-Sheet 2
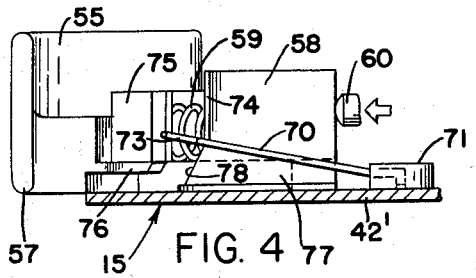
FIG. 4
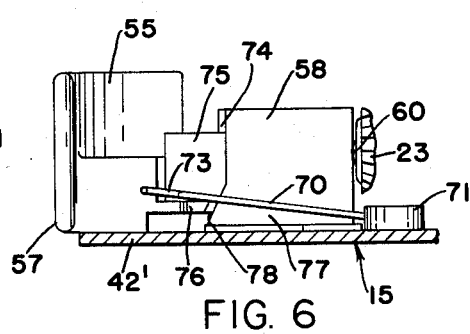
FIG. 6
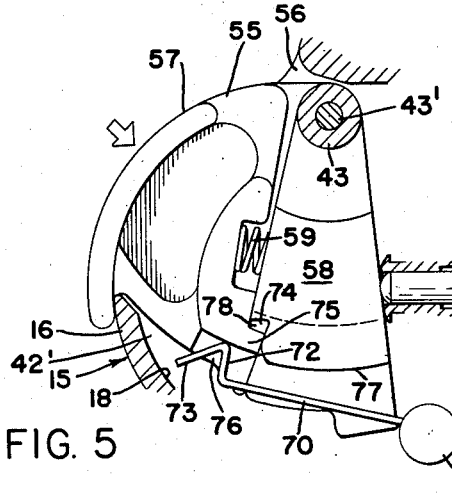
FIG. 5
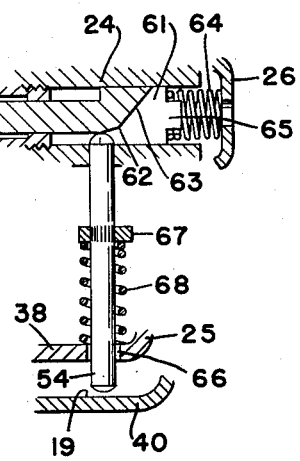
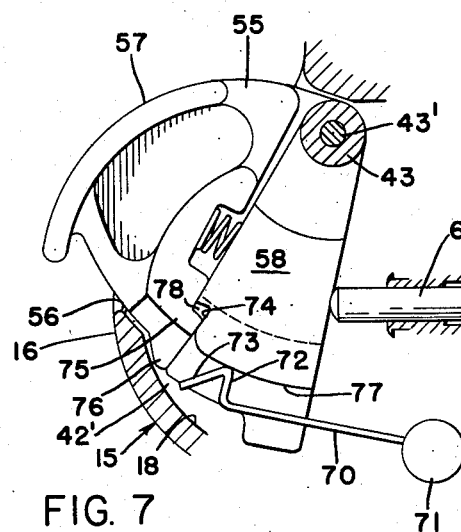
FIG. 7
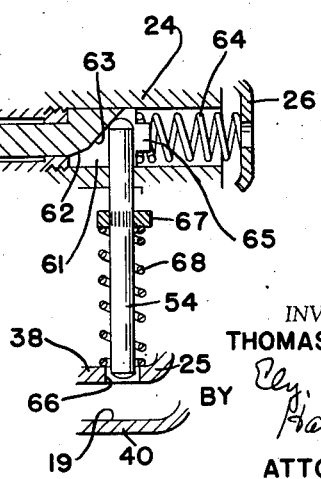
INVENTOR.
THOMAS F. SARAH
BY
ATTORNEYS

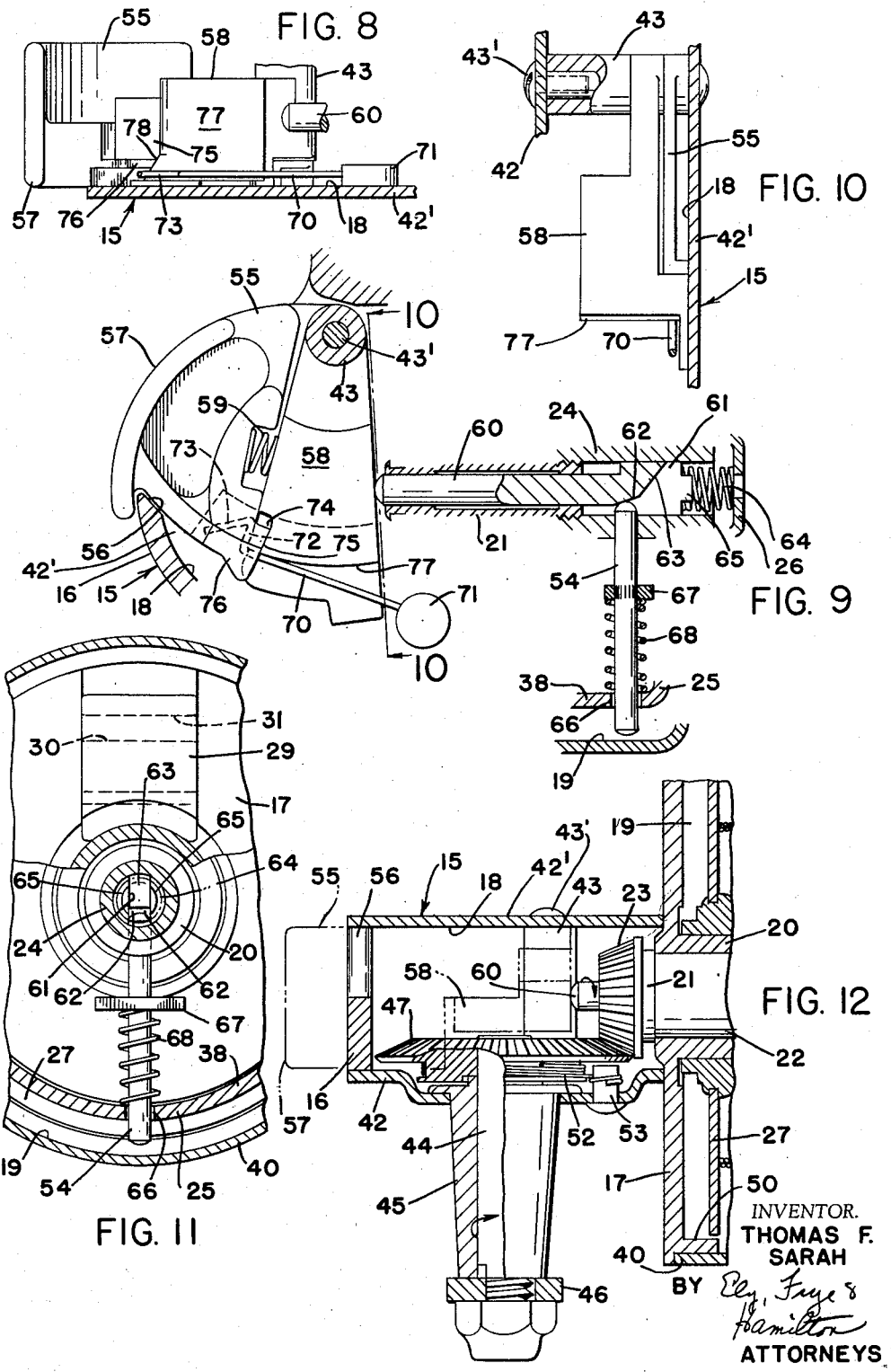

1

2,903,202

CLOSED FACE SPINNING REEL

Thomas F. Sarah, Akron, Ohio, assignor to The Enterprise Manufacturing Company, Akron, Ohio, a corporation of Ohio Application March 28, 1957, Serial No. 649,065

5 Claims. (Cl. 242—84.2)

The invention relates to fishing reels of the spinning type, and more particularly to spinning reels in which a stationary line spool and a rotatable flyer are completely enclosed.

In a reel of this type, rewinding is accomplished by a retractible pick-up pin which guides the line onto the spool, and during casting the pin is retracted to allow the line to spin from the spool.

In my prior co-pending application Serial No. 613,916, filed October 4, 1956, I disclose an improved push button mechanism for ejecting the pick-up pin to catch and hold the line at the end of a cast without allowing any interval during which the line is loose before starting to rewind, even though the fisherman changes hands between casting and rewinding. The present application is a continuation-in-part of said application Serial No. 613,916.

An object of the present invention is to provide a simplified and inexpensive push button mechanism for ejecting and retracting the pick-up pin.

Another object is to provide an improved braking means for the normally stationary spool to control paying out of the line when playing a fish.

These and other objects are accomplished by the improved reel comprising the present invention, a preferred embodiment of which is shown by way of example in the accompanying drawing and described in detail in the following specification. Various modifications and changes in details of construction are comprehended within the scope of the invention as defined in the appended claims.

Referring to the drawings:

Fig. 4 is a fragmentary bottom elevational view substantially on line 4—4 of Fig. 3.

Fig. 5 is a skeleton view similar to Fig. 3 showing the push button pushed in preparatory to casting and the pick-up pin held in ejected position.

Fig. 6 is a fragmentary bottom elevational view of the parts in the position of Fig. 5.

Fig. 7 is a skeleton view similar to Fig. 3, showing the push button released and the pick-up pin retracted for casting.

Fig. 8 is a fragmentary bottom elevational view of the parts in the position of Fig. 7.

Fig. 9 is a skeleton view similar to Fig. 3, showing the push button again pushed in to eject the pick-up pin.

Fig. 10 is a fragmentary sectional view as on line 10—10 of Fig. 9.

Fig. 11 is a cross sectional view, partly broken away, on line 11—11 of Fig. 3.

Fig. 12 is an enlarged fragmentary plan sectional view of the gear compartment, on line 12—12 of Fig. 1.

Figure 1:
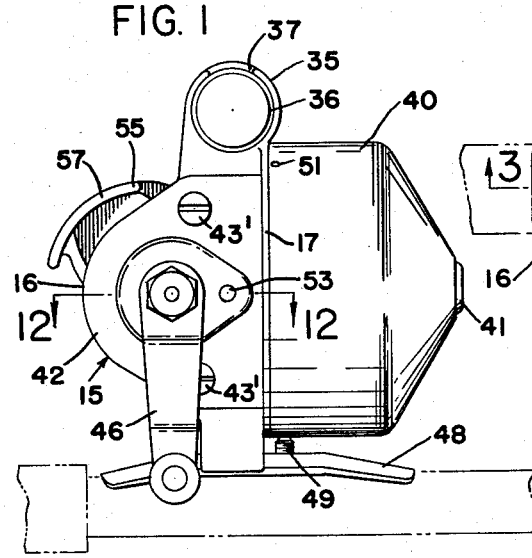
Fig. 1 is a side elevation of the improved reel mounted on a casting rod.
Figure 2:
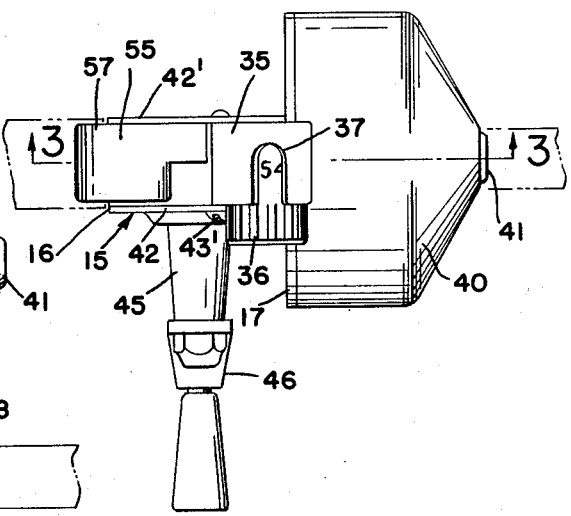
Fig. 2 is a top plan view thereof.
Figure 3:
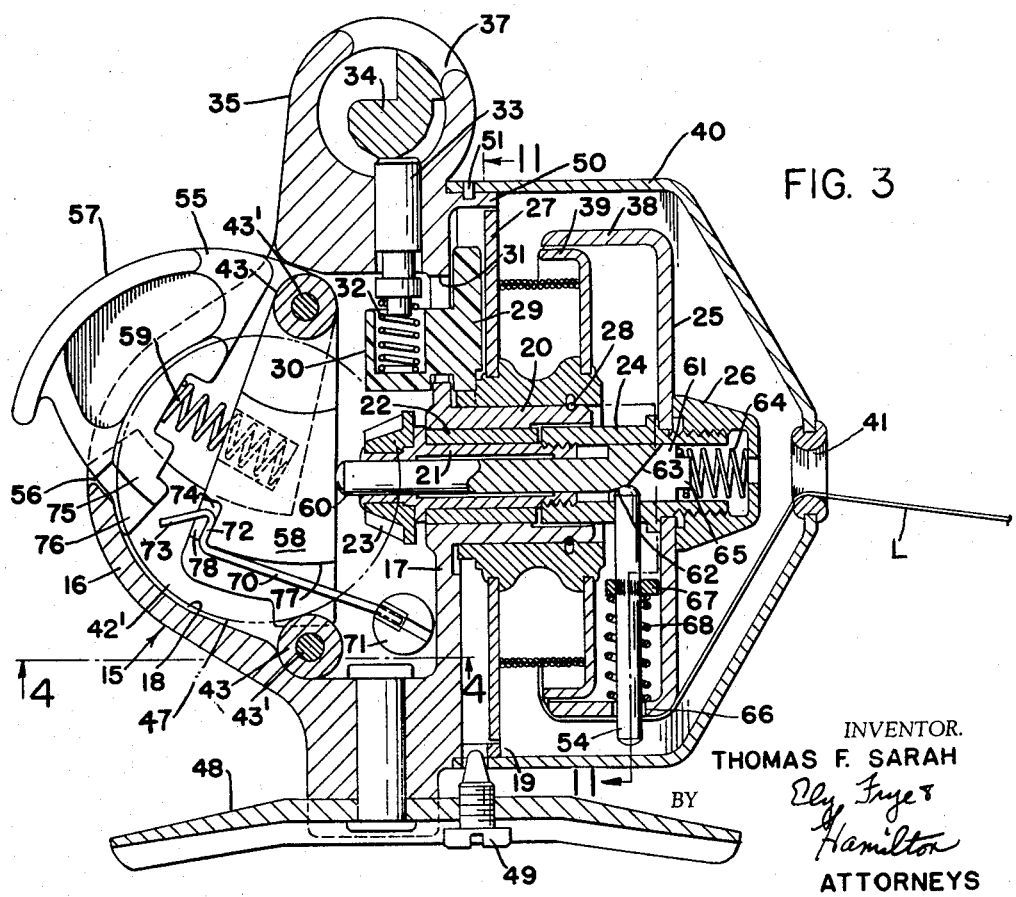
Fig. 3 is an enlarged vertical sectional view thereof on the plane of the reel axis, showing the pick-up pin ejected and engaging the line, taken on line 3—3 of Fig. 2.

Referring to Figs. 1–3, the improved reel includes a gear housing 15 having a rounded rear wall 16 and a substantially circular partition wall 17 dividing the gear compartment 18 from the spool compartment 19. A hub 20 is formed in the partition wall on the spool compartment side, and a tubular shaft 21 is journaled in a bushing 22 secured in said hub (Figs. 3 and 12). Within the gear compartment a bevel pinion 23 is fitted on the end of shaft 21, and the other end of the shaft is secured in a tubular bushing 24, the outer end of which carries a flyer disk 25 held in position by a hollow nut 26 screwed on the bushing.

The line spool 27 has a hub which is preferably rotatably mounted on the hub 20 by means of a snap ring 28, but the spool is normally held stationary by a friction brake shoe 29, preferably made of plastic material such as nylon. The shoe 29 has a rear portion 30 slidable radially in a slot 31 in the partition wall 17. The shoe is urged radially inward by a resilient element which may be a spring 32 seated in a socket in rear portion 30. The upper end of spring 32 is adjustably compressible by a plunger pin 33 engaged at its upper end by a cam 34 rotatable in a boss 35 on the top of housing 15. As shown in Fig. 2, the cam 34 may have an exterior thumb nut 36, and the portion within the boss 35 may have indicia visible through a slot 37 in the housing boss to indicate the amount of compression applied to the brake.

The flyer disk 25 preferably has a rearwardly extending peripheral flange 38 overlying the front peripheral flange 39 on the spool, and the flyer is rotatable with the shaft 21 and bushing 24 around the spool. A dome or cap 40 encloses the spool and flyer and has a conical front end with a central eyelet 41 for guiding the line L into and out of the cap. Within the cap the line passes over the peripheral flange 38 of the flyer onto the spool, as shown in Fig. 3.

The gear compartment 18 preferably has side plates 42 and 42', separated by pillars 43. The plate 42 is secured to the pillars by screws 43' and the crank shaft 44 is journaled in a hub 45 secured in and projecting laterally outward from said plate (Fig. 12). The crank handle 46 is secured on the outer end of said shaft 44, and a bevel gear 47 on the inner end of the shaft meshes with the pinion 23 to rotate the flyer shaft 21.

The bottom of gear housing 15 has a bracket plate 48 for fitting the top of a fishing rod, as shown in Fig. 1, and a screw 49 in the plate may be used to secure the peripheral flange of the cap 40 to an annular flange 50 on the housing, a dowel pin 51 serving to secure the cap to the housing at a point opposite to the screw 49. The reel shown in the drawings has its crank handle mounted for right hand rewinding, but the reel can easily be made for left hand operation by locating the plate 42 on the reverse side of the housing.

A torsion spring clutch may be provided to permit free rotation of the crank shaft in a direction to rewind the line and normally prevent rotation in a reverse direction. The clutch preferably comprises a torsion spring 52 wrapped around the shank of gear 47 (Fig. 12), the inner end of the spring being free to slide on the gear shank and the outer end being secured to a pin 53 in the housing plate 42. The spring is wrapped in the direction so as to unwrap when the shaft is turned in the direction of the arrow to rewind the line, and so as to tighten when the shaft is rotated in the opposite direction. However, the crank handle may be reversely rotated against the frictional resistance of the tightly wound spring sufficiently to position the lure at a desired distance from the end of the rod prior to making a cast, or for any other reason.

Referring to the push button mechanism for controlling the movement of the pick-up pin 54 mounted for radial movement on the interior of the flyer disk 25, the push button lever 55 is pivoted on the upper pillar 43 for swinging into the gear compartment 18 through a slot 56 in the curved rear wall 16 of the housing. The exterior part of the lever 55 has a curved flange 57 for being pressed by the thumb of the right hand holding the handle of the casting rod on which the reel is mounted.

The front face of lever 55 is arranged to abut the rear face of a sector shaped lever arm 58 also pivoted on the upper pillar 43, and the front face of arm 58 abuts the rear end of a plunger shaft 60 which is axially slidable in the flyer shaft 21, so that pressing inwardly on the button flange 57 moves the plunger shaft 60 forwardly. Between the adjacent faces of lever 55 and arm 58 is a compression spring 59 for a purpose to be described. The levers 55 and 58 may be considered push lever means to force the plunger shaft 60 forwardly and eject the pick-up pin 54.

The front end of plunger shaft 60 has a central slot 61 and the bottom of the slot is inclined to form a cam surface for abutting the inner end of pick-up pin 54. Preferably, the cam surface has a slightly inclined portion 62 for engaging the pick-up pin in its ejected position shown in Figs. 3, 5 and 9, and a steeply inclined portion 63 engaging the pin in its retracted position shown in Fig. 7. A helical spring 64 within the outer end of bushing 24 is held under compression by the nut 26 against the outer end of plunger 60 for urging it rearwardly. As shown, the outer end of plunger 60 may have segmental projections 65 on opposite sides of slot 61 for centering the spring 64.

The inner end of pick-up pin 54 is slidable through a hole in bushing 24, and the outer end is slidable through a hole 66 in the flange 38 of the flyer. Intermediate its ends the pin has an abutment collar 67 secured thereon and a compression spring 68 is interposed between the collar and the peripheral flange 38 to urge the pin radially inward.

A spring wire detent 7 for cooperating with the sector arm 58 is anchored at one end to the housing plate 42' by a screw or the like 71. The other end of the detent is bent to form an upwardly projecting hump having the upright portion 72 and the rearwardly extending portion 73. When the arm 58 is pressed inwardly and then released, as seen in Figs. 3 and 4, the upright portion 72 of the detent is held by its own tension in the notch 74 of the arm 58, holding the arm against rearward movement by the pressure of helical spring 64 acting against the plunger 60. The compression spring 59 has pushed the thumb lever 55 rearwardly until its lower end abuts the rear wall 16 of the housing. The reel is thus positioned to rewind or retrieve the line, and as the crank handle is turned the pickup pin guides the line onto the spool and winds it around the same.

In preparing to cast, the fisherman presses inwardly on the button 57 with his right thumb and holds the button in this position until the cast is started, at which time he releases the button to release the line. When the button is pressed in, the parts take the position of Figs. 5 and 6, in which the thumb lever 55 has abutted arm 58 and forced the plunger 60 slightly more forwardly so that the rear end of cam surface 62 is holding the pin 54 ejected slightly more than in Fig. 3.

This forward movement of lever 55 causes a cam projection 75 on the front face of the lever to engage the portion 73 of the detent and move it downwardly out of the notch 74 so that the hump rides along the bottom of the cam projection 75, as shown in Fig. 5. A flange 76 on lever 55 behind the cam projection 75 limits the inherent tendency of the detent to spring inwardly toward wall 42' when it is released from the notch 74, as shown in Fig. 6.

At the instant the cast is made the fisherman releases the button 57, allowing the plunger shaft 60 to be forced rearwardly by spring 64 and swinging both the arm 58 and thumb lever 55 rearwardly to the positions shown in Figs. 7 and 8. The rearward movement of plunger shaft 60 allows the spring 68 to move pick-up pin 54 radially inward as its inner end rides over the inclined cam surfaces 62 and 63. This retraction of the pick-up pin allows the line L to uncoil from the spool during the cast. The slight angle of surface 62 aids the spring 64 in overcoming the friction between pin 54 and shaft 60 when the shaft is released by the detent 70. As the arm 58 moves rearwardly to the position of Figs. 7 and 8, the hump on the detent rides along the lower curved surface 77 of the arm and the spring tension of the detent causes it to move inwardly to a position substantially parallel with wall 42', as clearly shown in Fig. 8, where the hump portion is behind the plane of projecting flange 76 on lever 55.

At the time the lure strikes the water at the end of a cast, the fisherman again presses button 57 inwardly, as shown in Fig. 9, to force plunger shaft 60 forwardly and eject the pick-up pin 54 to catch and hold the line until rewinding is started. This inward movement of lever 55 carrying arm 58 with it moves the surface 77 past the hump of detent 70, allowing it to spring upwardly behind the flange 76 of lever 55 into position to engage the notch 74 when lever 55 is released. In this position of the detent the upright portion 72 thereof engages an inclined cam surface 78 at the base of the notch (see Fig. 8), so that when the lever 55 is released and spring 59 moves it rearwardly, the flange 76 uncovers the hump and the spring pressure of spring 64, acting through plunger 60 and arm 58, causes portion 72 to slide along the cam surface 78 and engage in the notch 74.

The parts are now in the rewind position of Fig. 3, and as seen in Fig. 4, the detent has sprung away from wall 42', as the hump was guided into the notch 74 by inclined surface 78, so that the hump is on the front side of the plane of flange 76 in readiness to slide over the flange when the thumb lever 58 is again pressed forwardly to prepare for another cast.

The improved reel provides novel push button means for releasing the line at the start of a cast and for catching and holding the line during the time interval between the cast and the start of the rewinding operation, allowing plenty of time for the fisherman to change hands without the danger of having a loose line when a fish strikes. The push button is in a convenient position and the same actuation of the button is used both to release and to hold the line, making the whole casting operation extremely simple and trouble-free.

What is claimed is:

1. In a spinning reel having a normally stationary spool, a flyer rotatably mounted adjacent to the spool and a pick-up pin ejectable radially of the flyer to guide the line onto the spool, spring means urging said pin inwardly, a hollow shaft journaled axially within said spool and secured at its forward end to said flyer, a plunger axially slidable in said hollow shaft and having a cam surface on its forward end to engage and eject said pick-up pin, spring means urging said plunger rearwardly to allow retraction of said pick-up pin, a lever arm for moving said plunger forwardly, a spring detent for locking said lever arm in forward position with said pick-up pin ejected, a push lever for abutting said lever arm to move it forwardly, a spring urging said push lever rearwardly, means on said push lever to engage and release said detent on a forward stroke of said push lever, and a cam surface on said lever arm for guiding said detent into locking engagement with said arm on a successive forward stroke of said push lever.

2. In a spinning reel having a normally stationary spool, a flyer rotatably mounted adjacent to the spool and a pick-up pin ejectable radially of the flyer to guide the line onto the spool, spring means urging said pin inwardly, a hollow shaft journaled axially within said spool and secured at its forward end to said flyer, a plunger axially slidable in said hollow shaft and having a cam surface on its forward end to engage and eject said pick-up pin, spring means urging said plunger rearwardly to allow retraction of said pick-up pin, a lever arm abutting the rear end of said plunger and having a detent notch, a spring detent for engaging in said notch to lock said lever arm in forward position with said pick-up pin ejected, a push lever for abutting said lever arm to move it forwardly, and means on said push lever for releasing said detent from said notch on a forward stroke of said push lever and to allow re-engagement of said detent with said notch on the next forward stroke of said push lever.

3. In a spinning reel having a normally stationary spool, a flyer rotatably mounted adjacent to the spool and a pick-up pin ejectable radially of the flyer to guide the line onto the spool, spring means urging said pin inwardly, a hollow shaft journaled axially within said spool and secured at its forward end to said flyer, a plunger axially slidable in said hollow shaft and having a cam surface on its forward end to engage and eject said pick-up pin, spring means urging said plunger rearwardly to allow retraction of said pick-up pin, a lever arm abutting the rear end of said plunger and having a detent notch, a spring detent for engaging in said notch to lock said lever arm in forward position with said pick-up pin ejected, a push lever for abutting said lever arm to move it forwardly, a spring between said push lever and lever arm to urge the push lever rearwardly, and means on said push lever to release detent on a forward stroke of said push lever and to allow re-engagement of said detent with said notch on the next forward stroke of said push lever.

4. In a spinning reel having a normally stationary spool, a flyer rotatably mounted adjacent to the spool and a pick-up pin ejectable radially of the flyer to guide the line onto the spool, spring means urging said pin inwardly, a hollow shaft journaled axially within said spool and secured at its forward end to said flyer, a plunger axially slidable in said hollow shaft and having a cam surface on its forward end to engage and eject said pick-up pin, spring means urging said plunger rearwardly to allow retraction of said pick-up pin, a lever arm abutting the rear end of said plunger and having a detent notch, a spring detent for engaging in said notch to lock said lever arm in forward position with said pick-up arm ejected, said detent normally urged to a position out of alignment with said notch, a push lever for abutting said lever arm to move it forwardly, and means on said push lever to engage and release said detent on a forward stroke of said push lever and to allow re-engagement of said detent with said notch on the next forward stroke of said push lever.

5. In a spinning reel having a normally stationary spool, a flyer rotatably mounted adjacent to the spool and a pick-up pin ejectable radially of the flyer to guide the line onto the spool, spring means urging said pin inwardly, a hollow shaft journalled axially within said spool and secured at its forward end to said flyer, a plunger axially slidable in said hollow shaft and having a cam surface on its forward end to engage and eject said pick-up pin, spring means urging said plunger rearwardly to allow retraction of said pick-up pin, a lever arm abutting the rear end of said plunger and having a detent notch, a spring detent for engaging in said notch to lock said lever arm in forward position with said pick-up arm ejected, said detent normally urged to a position out of alignment with said notch, a push lever for abutting said lever arm to move it forwardly, means on said push lever to engage and release said detent on a forward stroke of said push lever, and a cam surface on said lever arm for guiding said detent into said notch on the next forward stroke of said push lever.

References Cited in the file of this patent
UNITED STATES PATENTS

| | | |
|---|---|---|
| 2,210,080 | Hover et al. | Aug. 6, 1940 |
| 2,507,457 | Rix | May 9, 1950 |
| 2,597,318 | Haase | May 30, 1952 |
| 2,667,312 | Denison | Jan. 26, 1954 |
| 2,668,025 | Hull | Feb. 2, 1954 |